United States Patent [19]

Itabashi

[11] 4,264,801
[45] Apr. 28, 1981

[54] METHOD OF WELDING TUBE TO HEADER OF HEAT EXCHANGER

[75] Inventor: Yukihiko Itabashi, Tokyo, Japan

[73] Assignee: Tokyo Shibaura Denki Kabushiki Kaisha, Kanagawa, Japan

[21] Appl. No.: 15,607

[22] Filed: Feb. 27, 1979

[30] Foreign Application Priority Data

Mar. 8, 1978 [JP] Japan .................................. 53-26319

[51] Int. Cl.³ ............................................. B23K 9/225
[52] U.S. Cl. .................................. 219/60.2; 219/118; 219/125.11
[58] Field of Search ................... 219/60.2, 125.11, 160, 219/118

[56] References Cited

U.S. PATENT DOCUMENTS

| | | | |
|---|---|---|---|
| 2,139,771 | 12/1938 | Riemenschneider | 219/160 X |
| 2,153,785 | 4/1939 | Williams | 219/160 X |

FOREIGN PATENT DOCUMENTS 744462  10/1966  Canada .................................... 219/60.2

OTHER PUBLICATIONS

"The Thermal & Nuclear Power" vol. 28, #6 Titanium Condenser Tube-Problems & their Solution pp. 53-61 by Sato et al., 6/77.

*Primary Examiner*—E. A. Goldberg
*Attorney, Agent, or Firm*—Stevens, Davis, Miller & Mosher

[57] ABSTRACT

In a method of welding a thin titanium tube to a titanium or titanium clad header of a heat exchanger, the titanium tube is inserted into a hole formed through the header and then the body portion of a core is inserted into the hole of the header. The core is provided with a support and a circular flange at a joint between the body portion and the support. The flange is provided with a notch extending radially inwardly of the flange. When the core is inserted into the hole of the header, the flange comes to engage the header and then the front end of an electrode is positioned in the notch to generate an electric arc, while rotating the core or only the flange, between the front end of the electrode and a portion of the header radially separated by a predetermined distance from the titanium tube. Thus, the header and the titanium tube are melted and welded by the arc.

3 Claims, 6 Drawing Figures

METHOD OF WELDING TUBE TO HEADER OF HEAT EXCHANGER

BACKGROUND OF THE INVENTION

This invention relates to a method of fabricating a multitublar heat exchanger and more particularly, a method of jointing heat transmitting tubes made of titanium with a header made of titanium.

Generally, a tube expanding method and a welding method are used as a method of jointing a heat transmitting tube with a header for fabricating a multitublar heat exchanger. The tube expanding method is illustrated in FIG. 1, in which the end portion of a heat transmitting tube 1 is inserted into a hole of a header 2 and then expanded so as to forcibly engage the expanded end portion of the tube 1 with the inner surface of the hole of the header 2. The welding method is illustrated in FIGS. 2 and 3, in which the heat transmitting tube 1 is welded to the header 2 by suitable welding means.

In a nuclear or steam electric power generating plant, there are installed a steam condenser, an air extractor, a gland-exhauster steam condenser or the like in which fluid having a low temperature and a low pressure is used. In such devices, for example a condenser having a large volume, although the heat transmitting tube is jointed with the header by the tube expanding method, the tube is subjected to a large force, which must be withstood by the jointed portion. Therefore, in the condenser used in a nuclear power plant, a plurality of grooves 5 are provided as shown in FIG. 4, for the hole 4 of the header 2 to firmly engage the header 2 with the heat transmitting tube 1 and to increase the grasping force of the header when the inserted tube end is expanded. However, in a case where a titanium tube is used as a heat transmitting tube 1, it is generally required for the titanium tube to have a thin thickness of about 0.5 mm in view of its working cost and its heat transfer rate. Moreover, titanium possesses a springback characteristic, so that it is impossible to obtain a desired grasping force between the titanium tube and the titanium or titanium clad header. For the reasons described above, the grapsing force is only one third of that of a heat exchanger using brass tubes. Therefore, in a heat exchanger using titanium tubes, when a pump for circulating cooling water is stopped and a large pressure is applied, the titanium tubes are subjected to an axial force, which mainly acts on and severely affects the joints between the tubes and the header.

In order to obviate the above defect, an improved method has been proposed wherein a titanium tube is welded to a header through a titanium plate or titanium clad plate. This method, however, also includes a problem that the titanium plate absorbes an active gas such as oxygen or nitrogen under a high temperature prevailing at the time of welding thereby weakening the same. To eliminate this problem, although it is desirable to carry out the welding in a shielding atmosphere of inert gas, since the condenser has generally a large volume, it is impossible to completely shield the portions of the titanium tube and the titanium header which are to be welded from the surrounding air. Furthermore, since the titanium tube is thinner than the titanium header, when welding them, the titanium tube will firstly be heated and melted before the titanium header is melted and the titanium tube 1 is partially melted away thereby to form a hole through the tube before completion of the welding.

SUMMARY OF THE INVENTION

Accordingly, an object of this invention is to provide an improved method of welding titanium tubes to a titanium or titanium clad header in a heat exchanger capable of preventing the welds from becoming brittle due to contamination of active gas and avoiding the abnormal local heat concentration of the titanium tube when it is arc welded.

According to this invention, the above object can be accomplished by providing a method of welding a thin titanium tube to a titanium or titanium clad header of a heat exchanger and the method is characterized by the steps of closely inserting the titanium tube into a hole formed through the header so that the inserted end of the titanium tube is flush with the surface of the header, preparing a core comprising a body portion to be inserted into the hole of the header, a support and a circular flange at a joint between the body portion and the support, the flange being provided with a notch extending radially inwardly of the flange, inserting the core into the hole of the header so as to contact the lower surface of the flange to the surface of the header, positioning an electrode in the notch and generating an arc while rotating the core between the electrode and a portion of the header radially separated by a predetermined distance from the titanium tube, whereby the header and the titanium tube are melted and welded by the arc.

DESCRIPTION OF THE PREFERRED EMBODIMENT

Figure 1:
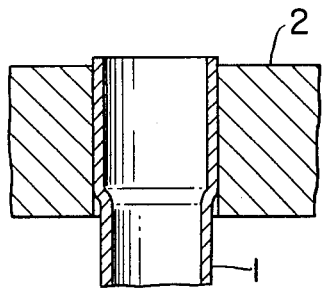
FIGS. 1 through 4 show conventional methods of jointing a heat transmitting tube with a header, respectively.
Figure 2:
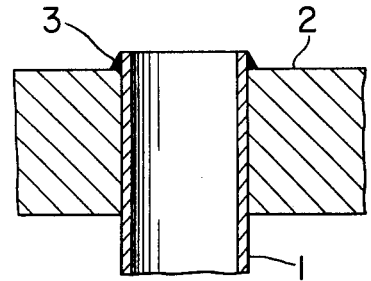
Figure 3:
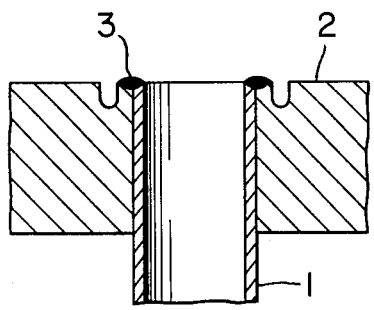
Figure 4:
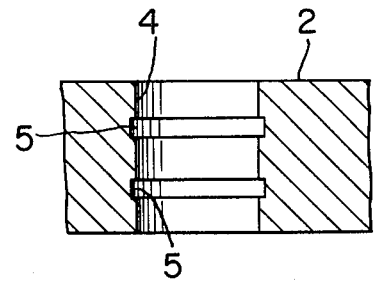
Figure 5:
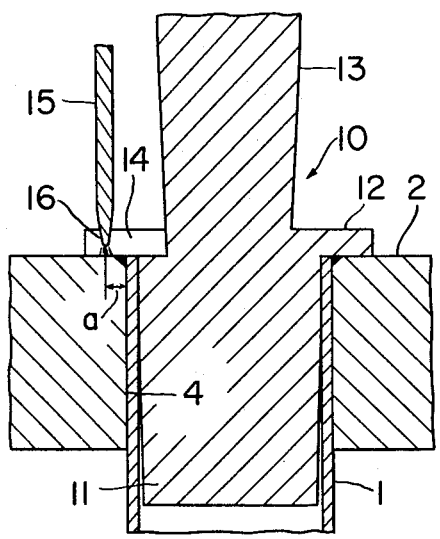
FIG. 5 shows an elevational cross-section, taken along the line V—V in FIG. 6, of a device for carrying out a method of welding a titanium tube to a titanium or titanium clad header according to this invention.

FIG. 5 is illustrated for explaining a welding method according to this invention carried out by using a core 10 having a flange 12 made a metal having a high thermal conductivity such as copper.

Figure 6:
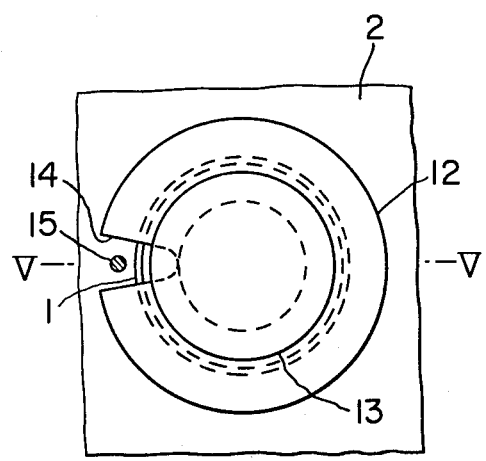
FIG. 6 shows a plan view of the device shown in FIG. 5.

The flanged core 10 comprises a body portion 11 adapted to be inserted into a titanium tube 1 and having a diameter substantially equal to the inner diameter thereof but slightly inwardly tapered at its lower end as shown in FIG. 5, and a support 13 for supporting a welding torch (not shown). The body portion 11 is constructed to be integral with the support 13 through a circular flange 12 which is provided with a notch 14 extending radially inwardly of the flange 12 as shown in FIG. 6. The front end 16 of electrode of the welding torch is positioned near the periphery of the hole 4 of a header 2 made of titanium and separated by a predetermined distance a from the periphery of the hole 4.

After the inserting the titanium tube 1 into the hole 4 of the header 2, the end of the tube 1 projecting from the upper surface of the hole 4 is cut away so that the end surface of the tube 1 is flush with the surface of the header 2 so as to prevent the generation of an arc between the electrode 15 and the projected end of the tube 1 and to effectively weld the tube 1 to the header 2.

Then, the inserted tube end is expanded by means of an expander (not shown) while limiting the reduction rate of the thickness of the titanium tube 1 to 0-5% for preventing the contamination of the weld caused by air used for expanding the tube 1 and for escaping gases generated during the welding operation.

After the completion of the expantion of the tube 1, the body portion 11 of the core 10 is inserted into the expanded tube end and an electric arc is struck at the front end 16 of the electrode 15 which is positioned apart by a predetermined distance a from the outer surface of the inserted tube 1, whereby the surface of titanium header 2 is firstly melted and the tube 1 is then fused by the heat transmitted from the molten portion of the header 2.

The welding operation described above is performed by rotating the core 10 or only the flange 12 for absorbing the heat of the welding by the flange 12 and the body portion 11, thus effectively cooling the welds.

Although, in the illustrated embodiment, the core 10 includes a solid body portion 11, it is possible to provide a hole in the central portion of the body portion 11 to pass water to increase the cooling effect.

What is claimed is:

1. In a method of welding a thin titanium tube to a titanium or titanium clad header in which said titanium tube is inserted into a hole formed through said header so that the inserted end of said titanium is flush with the surface of said header and said inserted titanium tube is preliminarily expanded to closely engage the wall of said hole, the improvement which comprises the steps of preparing a core including a body portion tapered slightly inwardly and adapted to be inserted into said titanium tube inserted into the hole of said header, a support and a circular flange at a joint between said body portion and said support, said flange being provided with a notch extending radially inwardly of the flange; inserting said core into the hole of said header so as to directly contact the lower surface of said flange with the surface of said header to directly absorb heat of said header to cool it; positioning an electrode in said notch; generating an electric arc between said electrode and a portion of said header radially separated by a predetermined distance from said titanium tube, and rotating said arc and said flange about said support, whereby said header and titanium tube are melted and welded by the arc.

2. The method according to claim 1 whereiin said core is rotated when it is inserted into said titanium tube while the arc is being struck.

3. The method according to claim 2 wherein only the flange of said core is rotated.

* * * * *